(12) United States Patent
Hiratani et al.

(10) Patent No.: US 12,221,505 B2
(45) Date of Patent: Feb. 11, 2025

(54) CURABLE RESIN COMPOSITION AND CURED OBJECT THEREOF

(71) Applicant: CANON KABUSHIKI KAISHA, Tokyo (JP)

(72) Inventors: Takayuki Hiratani, Tokyo (JP); Kyohei Wada, Tokyo (JP); Ryo Ogawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 633 days.

(21) Appl. No.: 17/528,659

(22) Filed: Nov. 17, 2021

(65) Prior Publication Data

US 2022/0073669 A1   Mar. 10, 2022

Related U.S. Application Data

(63) Continuation of application No. PCT/JP2020/020310, filed on May 22, 2020.

(30) Foreign Application Priority Data

May 24, 2019 (JP) .................. 2019-097824
Apr. 21, 2020 (JP) .................. 2020-075189

(51) Int. Cl.
| C08F 2/46 | (2006.01) |
| B33Y 70/00 | (2020.01) |
| C08F 2/50 | (2006.01) |
| C08F 285/00 | (2006.01) |
| C08G 61/04 | (2006.01) |

(52) U.S. Cl.
CPC ............ C08F 285/00 (2013.01); B33Y 70/00 (2014.12)

(58) Field of Classification Search
CPC ...... C08F 290/067; C08F 2/44; C08F 220/58; C08F 220/1811; C08F 220/52; C08F 285/00; C08F 226/00; B29C 64/135; B33Y 70/00; B33Y 10/00
USPC ................. 522/64, 6, 71, 1, 189, 184; 520/1
See application file for complete search history.

(56) References Cited

U.S. PATENT DOCUMENTS

| 9,809,731 B2 | 11/2017 | Niimi et al. |
| 11,840,597 B2 | 12/2023 | Hiratani et al. |
| 2009/0239968 A1 | 9/2009 | Kiyoyanagi et al. |
| 2014/0287167 A1 | 9/2014 | Ooga |
| 2019/0315979 A1 | 10/2019 | Hiratani et al. |
| 2021/0230341 A1 | 7/2021 | Hiratani et al. |
| 2022/0073725 A1 | 3/2022 | Hiratani et al. |

FOREIGN PATENT DOCUMENTS

| CN | 101495526 A |   | 7/2009 |
| CN | 104011100 A |   | 8/2014 |
| CN | 105992804 A |   | 10/2016 |
| CN | 112888719 A |   | 6/2021 |
| JP | 2000351819  | * | 12/2000 |
| JP | 2000351819 A | * | 12/2000 |
| JP | 2004-051665 A |   | 2/2004 |
| JP | 2011-213952 A |   | 10/2011 |
| JP | 2013-112715 A |   | 6/2013 |
| JP | 2014-201688 A |   | 10/2014 |
| JP | 2015-007191 A |   | 1/2015 |
| JP | 2015-164981 A |   | 9/2015 |
| JP | 2015-193725 A |   | 11/2015 |
| JP | 2017-095551 A |   | 6/2017 |
| JP | 2021-169597 A |   | 10/2021 |
| WO | 2013/099985 A1 |   | 7/2013 |
| WO | 2018/147242 A1 |   | 8/2018 |
| WO | 2018/165090 A1 |   | 9/2018 |
| WO | 2020/085166 A1 |   | 4/2020 |
| WO | 2020/241501 A1 |   | 12/2020 |
| WO | 2020/241502 A1 |   | 12/2020 |

OTHER PUBLICATIONS

Hayashi et al, JP 2000351819 Machine Translation, Dec. 19, 2000 (Year: 2000).*
Second Office Action in Chinese Application No. 202080037277.5 (Dec. 2023).
Extended European Search Report in European Application No. 20813501.2 (Jun. 2023).
Notice of Allowance in U.S. Appl. No. 17/229,026 (Sep. 2023).
Bulletin of the American Physical Society, Series II, vol. 1, No. 3, p. 123 (1956).
International Search Report in International Application No. PCT/JP2020/020310 (Aug. 2020).
Notice of Reasons for Refusal in Japanese Application No. 2020-089617 (Jan. 2024).

(Continued)

Primary Examiner — Jessica Whiteley
(74) Attorney, Agent, or Firm — Venable LLP (57) ABSTRACT

Provided is a curable resin composition with which a cured object with low water absorbency and good impact resistance and heat resistance can be formed and which is preferably usable in three-dimensional shaping. The curable resin composition contains: a polyfunctional urethane (meth)acrylate (A); a hydrophilic monofunctional radical-polymerizable compound (B); a hydrophobic monofunctional radical-polymerizable compound (C); rubber particles (D); and a radical polymerization initiator (E), and the content of the rubber particles (D) is 8 parts by mass or more and 50 parts by mass or less with respect to 100 parts by mass of radical-polymerizable compounds.

19 Claims, 1 Drawing Sheet

(56) References Cited

OTHER PUBLICATIONS

International Preliminary Report on Patentability in International Application No. PCT/JP2020/020310 (Dec. 2021).
First Office Action in Chinese Application No. 202080037277.5 (May 2023).
Hiratani et al., U.S. Appl. No. 17/528,636, filed Nov. 17, 2021.
Notice of Reasons for Refusal in Japanese Application No. 2020-089617 (May 2024).
Non-final Office Action in U.S. Appl. No. 17/229,026 (Mar. 2023).
Notice of Reasons for Refusal in Japanese Application No. 2020-089618 (Jul. 2024).

* cited by examiner

CURABLE RESIN COMPOSITION AND CURED OBJECT THEREOF

CROSS-REFERENCE TO RELATED APPLICATIONS

This application is a Continuation of International Patent Application No. PCT/JP2020/020310, filed May 22, 2020, which claims the benefit of Japanese Patent Application No. 2019-097824, filed May 24, 2019, and Japanese Patent Application No. 2020-075189, filed Apr. 21, 2020, all of which are hereby incorporated by reference herein in their entirety.

BACKGROUND OF THE INVENTION

Field of the Invention

The present disclosure relates to a curable resin composition and a cured object thereof.

Description of the Related Art

An optical three-dimensional shaping method has been known in which a step of forming a cured resin layer by selectively irradiating a photo-curable resin composition with light based on the three-dimensional shape of a three-dimensional model is repeated to thereby fabricate a shaped object in which the cured resin layers thus formed are laminated together (hereinafter referred to as "stereolithography method").

Specifically, according to slice data generated from three-dimensional shape data on a three-dimensional model to be fabricated, the liquid surface of a liquid photo-curable resin composition stored in a container is irradiated with light such as an ultraviolet laser beam to thereby form a cured resin layer having a desired pattern with a predetermined thickness. The photo-curable resin composition is then supplied onto this cured resin layer and similarly irradiated with light to thereby form and laminate a new cured resin layer joined to the previously formed cured resin layer. By laminating cured resin layers in patterns based on the slice data, a desired three-dimensionally shaped object can be obtained. With such a stereolithography method, even a three-dimensional object of a complicated shape can be easily fabricated as long as there is three-dimensional shape data on its three-dimensional model.

Stereolithography methods have been increasingly applied to the shaping of prototypes for shape checking (rapid prototyping), the shaping of working models for functionality verification, and the shaping of molds (rapid tooling). Moreover, in recent years, the stereolithography methods have been starting to be applied to the shaping of actual products (rapid manufacturing).

Due to such circumstances, there has been a demand for photo-curable resin compositions that enable shaping of a three-dimensionally shaped object having high impact resistance comparable to that of general-purpose engineering plastics and such high heat resistance that the object may not deform even at relatively high temperature. Furthermore, in addition to the above, there has been a demand for low water absorbency that exhibits high dimensional stability even in a high-humidity environment.

Japanese Patent Application Laid-Open No. 2004-51665 and Japanese Patent Application Laid-Open No. 2014-201688 disclose resin compositions for optical three-dimensional shaping containing urethane (meth)acrylate, an ethylenically unsaturated compound having a radical-polymerizable group(s), rubber particles, and a radical polymerization initiator.

However, cured objects of the resin compositions for optical three-dimensional shaping in Japanese Patent Application Laid-Open No. 2004-51665 and Japanese Patent Application Laid-Open No. 2014-201688 are not satisfactory in achieving both good mechanical strength and low water absorbency.

SUMMARY OF THE INVENTION

An object of the present disclosure is to provide a curable resin composition with which a cured object with low water absorbency and good impact resistance and heat resistance can be obtained. A curable resin composition according to the present disclosure is characterized in that it contains: a polyfunctional urethane (meth)acrylate (A) having at least two (meth)acryloyl groups and at least two urethane groups within a molecule; a hydrophilic monofunctional radical-polymerizable compound (B) having one radical-polymerizable functional group within a molecule; a hydrophobic monofunctional radical-polymerizable compound (C) having one radical-polymerizable functional group within a molecule; rubber particles (D); and a radical polymerization initiator (E), and a content of the rubber particle (D) is 8 parts by mass or more and 50 parts by mass or less with respect to 100 parts by mass of a total of radical-polymerizable compounds excluding the (D).

Further features of the present disclosure will become apparent from the following description of exemplary embodiments with reference to the attached drawing.

BRIEF DESCRIPTION OF THE DRAWINGS

FIGURE is a schematic diagram illustrating an example of the configuration of a stereolithography apparatus.

DESCRIPTION OF THE EMBODIMENTS

Figure 1:
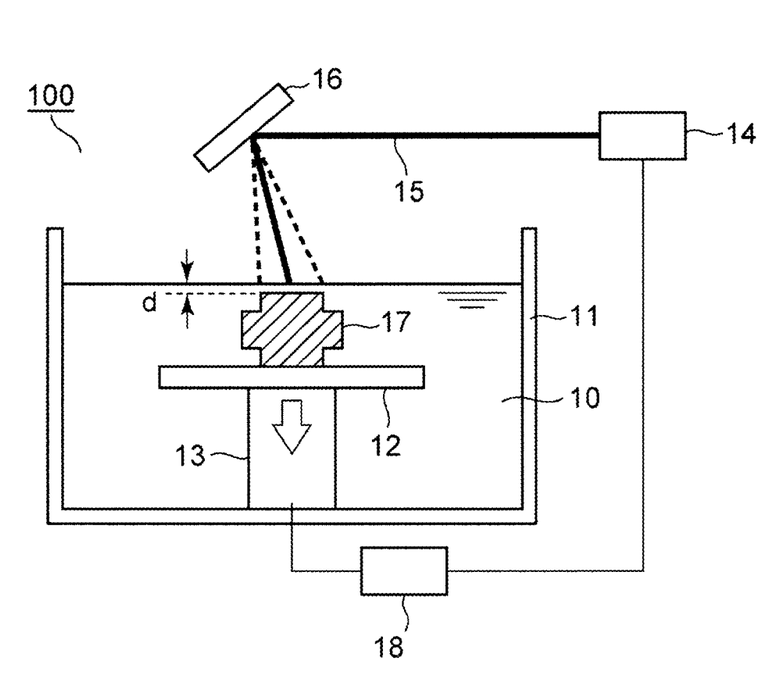

An embodiment of the present invention (hereinafter also referred to as "the present embodiment") will be described below. Note that the embodiment to be described below is merely one embodiment, and the present invention is not limited to this embodiment.

<Polyfunctional Urethane (Meth)acrylate (A)>

A polyfunctional urethane (meth)acrylate (A) contained in a curable composition in the present embodiment is a urethane (meth)acrylate having at least two (meth)acryloyl groups and at least two urethane groups within a molecule.

As the polyfunctional urethane (meth)acrylate (A), it is possible to use, for example, one obtained by reacting a hydroxyl group-containing (meth)acrylate-based compound and a polyisocyanate-based compound, or one obtained by reacting an isocyanate group-containing (meth)acrylate-based compound and a polyol-based compound. Besides the above, it is possible to use one obtained by reacting a hydroxyl group-containing (meth)acrylate-based compound, a polyisocyanate-based compound, and a polyol-based compound. Among them, the one obtained by reacting a hydroxyl group-containing (meth)acrylate-based compound, a polyisocyanate-based compound, and a polyol-based compound is preferred from the viewpoint that it can achieve high impact resistance.

Examples of the hydroxyl group-containing (meth)acrylate-based compound include hydroxyalkyl (meth)acrylates such as 2-hydroxyethyl (meth)acrylate, 2-hydroxypropyl (meth)acrylate, 2-hydroxybutyl (meth)acrylate, 4-hydroxybutyl (meth)acrylate, and 6-hydroxyhexyl (meth)acrylate, 2-hydroxyethylacryloyl phosphate, 2-(meth)acryloyloxyethyl-2-hydroxypropyl phthalate, caprolactone-modified 2-hydroxyethyl (meth)acrylate, dipropylene glycol (meth)acrylate, fatty acid-modified glycidyl (meth)acrylate, polyethylene glycol mono(meth)acrylate, polypropylene glycol mono(meth)acrylate, 2-hydroxy-3-(meth)acryloyloxypropyl (meth)acrylate, glycerin di(meth)acrylate, 2-hydroxy-3-acryloyl-oxypropyl methacrylate, pentaerythritol tri(meth)acrylate, caprolactone-modified pentaerythritol tri(meth)acrylate, ethylene oxide-modified pentaerythritol tri(meth)acrylate, dipentaerythritol penta(meth)acrylate, caprolactone-modified dipentaerythritol penta(meth)acrylate, ethylene oxide-modified dipentaerythritol penta(meth)acrylate, and the like. One of these hydroxyl group-containing (meth)acrylate-based compounds may be used alone, or two or more may be used in combination.

Examples of the polyisocyanate-based compound include: aromatic polyisocyanates such as tolylene diisocyanate, diphenylmethane diisocyanate, polyphenylmethane polyisocyanate, modified diphenylmethane diisocyanate, xylylene diisocyanate, tetramethylxylylene diisocyanate, phenylene diisocyanate, and naphthalene diisocyanate; aliphatic polyisocyanates such as pentamethylene diisocyanate, hexamethylene diisocyanate, trimethylhexamethylene diisocyanate, lysine diisocyanate, and lysine triisocyanate; alicyclic polyisocyanates such as hydrogenated diphenylmethane diisocyanate, hydrogenated xylylene diisocyanate, isophorone diisocyanate, norbornene diisocyanate, and 1,3-bis(isocyanatomethyl)cyclohexane; trimeric compounds or multimeric compounds of these polyisocyanates; allophanate-type polyisocyanates, biuret-type polyisocyanates, water-dispersed polyisocyanates, and the like. One of these polyisocyanate-based compounds may be used alone, or two or more may be used in combination.

Examples of the polyol-based compound include a polyether-based polyol, polyester-based polyol, polycarbonate-based polyol, polyolefin-based polyol, polybutadiene-based polyol, (meth)acrylic-based polyol, polysiloxane-based polyol, and the like. One of these polyol-based compounds may be used alone, or two or more may be used in combination.

Examples of the polyether-based polyol include polyether-based polyols having an alkylene structure such as polyethylene glycol, polypropylene glycol, polytetramethylene glycol, polybutylene glycol, and polyhexamethylene glycol, and random or block copolymers of these polyalkylene glycols.

Examples of the polyester-based polyol include a polycondensate of a polyalcohol and a polycarboxylic acid, the product of ring-opening polymerization of a cyclic ester (lactone), the product of a reaction among three types of components of a polyalcohol, a polycarboxylic acid, and a cyclic ester, and the like.

Examples of the polyalcohol include ethylene glycol, diethylene glycol, propylene glycol, dipropylene glycol, trimethylene glycol, 1,4-tetramethylenediol, 1,3-tetramethylenediol, 2-methyl-1,3-trimethylenediol, 1,5-pentamethylenediol, neopentyl glycol, 1,6-hexamethylenediol, 3-methyl-1,5-pentamethylenediol, 2,4-diethyl-1,5-pentamethylenediol, glycerin, trimethylolpropane, trimethylolethane, cyclohexanediols (such as 1,4-cyclohexanediol), bisphenols (such as bisphenol A), sugar alcohols (such as xylitol and sorbitol), and the like.

Examples of the polycarboxylic acid include: aliphatic dicarboxylic acids such as malonic acid, maleic acid, fumaric acid, succinic acid, glutaric acid, adipic acid, suberic acid, azelaic acid, sebacic acid, and dodecanedioic acid; alicyclic dicarboxylic acids such as 1,4-cyclohexanedicarboxylic acid; aromatic dicarboxylic acids such as terephthalic acid, isophthalic acid, ortho-phthalic acid, 2,6-naphthalenedicarboxylic acid, para-phenylenedicarboxylic acid, and trimellitic acid; and the like.

Examples of the cyclic ester include propiolactone, β-methyl-δ-valerolactone, ε-caprolactone, and the like.

Examples of the polycarbonate-based polyol include the product of a reaction between a polyalcohol and phosgene, the product of ring-opening polymerization of a cyclic carbonic acid ester (such as alkylene carbonate), and the like.

The polyalcohol for the polycarbonate-based polyol includes the polyalcohols exemplarily listed in the description of the polyester-based polyol. Examples of the alkylene carbonate include ethylene carbonate, trimethylene carbonate, tetramethylene carbonate, hexamethylene carbonate, and the like.

Note that the polycarbonate-based polyol only needs to be a compound having intramolecular carbonate bonds and terminal hydroxyl groups, and may have ester bonds together with the carbonate bonds.

The weight average molecular weight of the polyfunctional urethane (meth)acrylate (A) in the curable resin composition in the present embodiment is preferably 1000 or more and 60000 or less. The weight average molecular weight is more preferably 2000 or more and 50000 or less. It is preferred that the weight average molecular weight be preferably 1000 or more since, in this way, the impact resistance of a cured object tends to significantly increase with drop in crosslink density. It is not preferred that the weight average molecular weight be more than 60000 since, in this way, the viscosity of the curable composition tends to rise, thus making it difficult to handle the curable composition.

Note that the weight average molecular weight (Mw) of the polyfunctional urethane (meth)acrylate (A) is a weight average molecular weight in terms of the molecular weight of standard polystyrene, and is measured using a high-performance liquid chromatograph (manufactured by Tosoh Corporation, high-performance GPC apparatus "HLC-8220GPC") with two Shodex GPCLF-804 columns (exclusion limit molecular weight: $2\times10^6$, separation range: 300 to $2\times10^6$) in series.

Also, the radical-polymerizable functional group equivalent of the polyfunctional urethane (meth)acrylate (A) is preferably 400 g/eq or more. In the present embodiment, the radical-polymerizable functional group equivalent is a value indicating the molecular weight per radical-polymerizable functional group. It is not preferred that the radical-polymerizable functional group equivalent be less than 400 g/eq since, in this way, the impact resistance tends to decrease with rise in crosslink density.

The content of the polyfunctional urethane (meth)acrylate (A) in the curable resin composition in the present embodiment is preferably 5 parts by mass or more and 70 parts by mass or less with respect to 100 parts by mass of a total of the polyfunctional urethane (meth)acrylate (A) and the other radical-polymerizable compounds. The content is more preferably 10 parts by mass or more and 60 parts by mass or less. Setting the content of the polyfunctional urethane (meth)acrylate (A) within the above range makes it possible to achieve both high impact resistance and high heat resistance. If the content of the polyfunctional urethane (meth)acrylate (A) is less than 5 parts by mass, the impact resistance tends to decrease. Also, if the content of the polyfunctional urethane (meth)acrylate is more than 70 parts by mass, the heat resistance tends to decrease and also the viscosity of the resin composition tends to be higher than a range suitable for materials for stereolithography methods.

(Hydrophilic Monofunctional Radical-Polymerizable Compound (B))

A hydrophilic monofunctional radical-polymerizable compound (B) contained in the curable resin composition in the present embodiment is a compound that has one radical-polymerizable functional group within a molecule and exhibits water solubility. In the present invention, a hydrophilic monofunctional radical-polymerizable compound represents one whose solubility to water is 2.5 [g/100 g] or more. Here, the solubility to water indicates the amount of the hydrophilic monofunctional radical-polymerizable compound (B) that can be dissolved into 100 g of water at 25° C. In the following, the hydrophilic monofunctional radical-polymerizable compound (B) will also be referred to simply as the compound (B).

The radical-polymerizable functional group includes an ethylenically unsaturated group. Specifically, the ethylenically unsaturated group includes the (meth)acryloyl group, vinyl group, and the like. Note that the (meth)acryloyl group herein means the acryloyl group or the methacryloyl group.

Examples of the hydrophilic monofunctional radical-polymerizable compound (B) having a (meth)acryloyl group include a hydrophilic monofunctional acrylamide-based compound and a hydrophilic monofunctional (meth)acrylate-based compound.

Examples of the hydrophilic monofunctional acrylamide-based compound include (meth)acrylamide, N-methyl (meth)acrylamide, N-isopropyl (meth)acrylamide, N-methylol (meth)acrylamide, diacetone (meth)acrylamide, N,N-dimethyl (meth)acrylamide, N,N-diethyl (meth)acrylamide, N-(meth)acryloylmorpholine, N-[3-(dimethylamino)propyl] acrylamide, and the like.

Examples of the hydrophilic monofunctional (meth)acrylate-based compound include (meth)acrylic acid, methyl acrylate, 2-hydroxyethyl (meth)acrylate, 2-hydroxypropyl (meth)acrylate, 2-hydroxybutyl (meth)acrylate, 4-hydroxybutyl (meth)acrylate, dimethylaminomethyl (meth)acrylate, 2-hydroxyethyl (meth)acryloyl phosphate, methoxy polyethylene glycol methacrylate, N,N-dimethylaminoethyl (meth)acrylate, N,N-diethylaminoethyl (meth)acrylate, and the like.

Also, examples of the hydrophilic monofunctional radical-polymerizable compound having a vinyl group include vinyl acetate and a hydrophilic N-vinyl compound. Examples of the hydrophilic N-vinyl compound include N-vinylpyrrolidone, N-vinylcaprolactam, N-vinylacetamide, and the like.

Examples of hydrophilic monofunctional radical-polymerizable compounds other than the above include styrene derivatives such as styrenesulfonic acid and salts thereof and vinyl cyanide compounds such as (meth)acrylonitrile.

One of these hydrophilic monofunctional radical-polymerizable compounds may be used alone, or two or more may be used in combination.

From the viewpoint of the dimensional stability of a cured object, the preferred range of content of the hydrophilic monofunctional radical-polymerizable compound (B) in the curable resin composition in the present embodiment varies by the solubility of the hydrophilic monofunctional radical-polymerizable compound (B) to water. The content of the hydrophilic monofunctional radical-polymerizable compound (B) when its solubility to water is 20 [g/100 g] or more is preferably 55 parts by mass or less and more preferably 50 parts by mass or less with respect to 100 parts by mass of a total of radical-polymerizable compounds including the hydrophilic monofunctional radical-polymerizable compound (B). If the solubility to water is 20 [g/100 g] or more and the content of the hydrophilic monofunctional radical-polymerizable compound is more than 55 parts by mass, a cured object of the curable resin composition will have a high water absorption rate. Thus, when exposed to a high-humidity environment, the cured object tends to absorb water such that its dimension changes beyond an allowable range. Also, the content of the hydrophilic monofunctional radical-polymerizable compound (B) in the curable resin composition when its solubility to water is less than 20 [g/100 g] is preferably 65 parts by mass or less and more preferably 60 parts by mass or less with respect to 100 parts by mass of a total of radical-polymerizable compounds including the hydrophilic monofunctional radical-polymerizable compound (B). When the curable resin composition contains both a compound whose solubility to water is 20 [g/100 g] or more and a compound whose solubility to water is less than 20 [g/100 g] as the hydrophilic monofunctional radical-polymerizable compound (B), the upper limit content of the compound (B) can be calculated from the equation below. That is, in the case where the total of the hydrophilic monofunctional radical-polymerizable compounds is 100 parts by mass and the content ratio of the hydrophilic monofunctional radical-polymerizable compound whose solubility to water is 20 [g/100 g] or more is X parts by mass, the upper limit content can be calculated as $(55 \times X + 65 \times (100-X))/100$ [parts by mass].

Also, in the case of using the curable resin composition in stereolithography, the content of the hydrophilic monofunctional radical-polymerizable compound (B) in the curable resin composition in the present embodiment is preferably 10 parts by mass or more regardless of the solubility to water, from the viewpoint of viscosity. The content is more preferably 15 parts by mass or more. The content of the hydrophilic monofunctional radical-polymerizable compound (B) is preferably 10 parts by mass or more since, in this way, the rise in the viscosity of the curable resin composition due to the addition of rubber particles (D) tends to be alleviated.

Specifically, the preferred range of content of the hydrophilic monofunctional radical-polymerizable compound (B) in the curable resin composition is 10 parts by mass or more and 65 parts by mass or less and more preferably 15 parts by mass or more and 55 parts by mass or less with respect to 100 parts by mass of a total of radical-polymerizable compounds including the hydrophilic monofunctional radical-polymerizable compound (B).

(Hydrophobic Monofunctional Radical-Polymerizable Compound (C))

In the present invention, a hydrophobic monofunctional radical-polymerizable compound (C) contained in the curable resin composition refers to a compound which has one radical-polymerizable functional group within a molecule and whose solubility to water is less than 2.5 [g/100 g].

The radical-polymerizable functional group includes an ethylenically unsaturated group. Specifically, the ethylenically unsaturated group includes the (meth)acryloyl group, vinyl group, and the like. Note that the (meth)acryloyl group herein means the acryloyl group or the methacryloyl group.

Examples of the hydrophobic monofunctional radical-polymerizable compound (C) having a (meth)acryloyl group include a hydrophobic monofunctional acrylamide-based compound and a hydrophobic monofunctional (meth)acrylate-based compound.

The hydrophobic monofunctional acrylamide-based compound includes N-tert-butyl (meth)acrylamide, N-phenyl (meth)acrylamide, N-(meth)acryloylpiperidine, and the like.

Examples of the hydrophobic monofunctional (meth) acrylate-based compound include methyl methacrylate, ethyl (meth)acrylate, n-butyl (meth)acrylate, isobutyl (meth)acrylate, t-butyl (meth)acrylate, 2-ethylhexyl (meth)acrylate, n-octyl (meth)acrylate, i-octyl (meth)acrylate, lauryl (meth)acrylate, stearyl (meth)acrylate, cyclohexyl (meth) acrylate, isobornyl (meth)acrylate, adamantyl (meth)acrylate, 3-hydroxy-1-adamantyl (meth)acrylate, 3,5-hydroxy-1-adamantyl (meth)acrylate, 2-methyl-2-adamantyl (meth) acrylate, 2-ethyl-2-adamantyl (meth)acrylate, 2-isopropyl-2-adamantyl (meth)acrylate, glycidyl (meth)acrylate, 3-methyl-3-oxetanyl-methyl (meth)acrylate, tetrahydrofurfuryl (meth)acrylate, phenylglycidyl (meth)acrylate, phenyl cellosolve (meth)acrylate, dicyclopentenyl (meth)acrylate, dicyclopentenyloxyethyl (meth)acrylate, biphenyl (meth) acrylate, phenyl (meth)acrylate, phenoxyethyl (meth)acrylate, phenoxypropyl (meth)acrylate, benzyl (meth)acrylate, trifluoromethyl (meth)acrylate, trifluoroethyl (meth)acrylate, tetrafluoropropyl (meth)acrylate, octafluoropentyl acrylate, polyethylene glycol (meth)acrylate, polypropylene glycol (meth)acrylate, allyl (meth)acrylate, 2,2,2-trifluoroethyl (meth)acrylate, 2,2,3,3-tetrafluoropropyl (meth)acrylate, 1H,1H,5H, octafluoropentyl (meth)acrylate, allyloxymethyl acrylate (product name: AO-MA, manufactured by Nippon Shokubai Co., Ltd.), (meth)acrylates each having an imide group (product name: M-140, manufactured by Toagosei Co., Ltd.), and the like.

Examples of hydrophobic monofunctional radical-polymerizable compounds having an ethylenically unsaturated group other than the above include: styrene; styrene derivatives such as vinyltoluene, α-methylstyrene, and chlorostyrene; maleimides such as ethylmaleimide, propylmaleimide, butylmaleimide, hexylmaleimide, octylmaleimide, dodecylmaleimide, stearylmaleimide, phenylmaleimide, and cyclohexylmaleimide; vinyl esters such as vinyl propionate, vinyl pivalate, vinyl benzoate, and vinyl cinnamate; N-vinyl compounds such as N-vinylphthalimide and N-vinylcarbazol; and the like.

Considering the dimensional stability of an object fabricated by curing the curable resin composition, the content of the hydrophobic monofunctional radical-polymerizable compound (C) in the curable resin composition is preferably 5 parts by mass or more with respect to 100 parts by mass of a total of radical-polymerizable compounds including the hydrophobic monofunctional radical-polymerizable compound (C). The content is more preferably 10 parts by mass or more. If the content of the hydrophobic monofunctional radical-polymerizable compound is less than 5 parts by mass, the water absorption rate is high such that, in a high-humidity environment, the dimension tends to change beyond an allowable range due to water absorption. In other words, the water absorption rate is such that the dimension does not change beyond the allowable range and mechanical properties do not greatly change.

In the case of using a compound having an alicyclic hydrocarbon group as the hydrophobic monofunctional radical-polymerizable compound (C), its content is preferably less than 60 parts by mass with respect to 100 parts by mass of a total of the radical-polymerizable compounds in the present embodiment. The content is more preferably 55 parts by mass or less. If the content of the hydrophobic monofunctional radical-polymerizable compound having an alicyclic hydrocarbon group is 60 parts by mass or more, the viscosity of the curable resin composition rises when the rubber particles (D) are added. It therefore tends to be difficult to handle the curable resin composition. For example, in the case of using the curable resin composition as the shaping material for a stereolithography method, the rise in viscosity may increase the shaping time and may also make the shaping itself difficult.

Examples of the hydrophobic monofunctional radical-polymerizable compound having an alicyclic hydrocarbon group include isobornyl (meth)acrylate, dicyclopentanyl (meth)acrylate, dicyclopentenyl (meth)acrylate, cyclohexyl (meth)acrylate, 4-t-butylcyclohexyl acrylate, 3,3,5-trimethylcyclohexyl acrylate, 2-methyl-2-adamantyl (meth)acrylate, 2-ethyl-2-adamantyl (meth)acrylate, and the like.

The glass transition temperature (Tg) of a copolymer of a mixture of the hydrophobic monofunctional radical-polymerizable compound (C) and the hydrophilic monofunctional radical-polymerizable compound (B) is preferably 85° C. or more. The glass transition temperature is more preferably 90° C. or more. Tg of the copolymer can be derived with the Fox equation (Equation (1)). The unit of Tg is absolute temperature.

$$1/Tg = \Sigma(Wi/Tgi) \qquad \text{Equation (1)}$$

In Equation (1) above, Wi represents the mass ratio of each the hydrophilic and hydrophobic monofunctional radical-polymerizable compounds in the copolymer. Tgi is the glass transition temperature (the unit is absolute temperature) of a homopolymer of each of the hydrophilic and hydrophobic radical-polymerizable compounds. Details of the Fox equation are described in Bulletin of the American Physical Society, Series 2, Vol. 1, No. 3, p. 123 (1956). For the glass transition temperature (Tgi) of the homopolymer of each of the various radical-polymerizable compounds to be used in the Fox equation, it is possible to employ a value that is generally known for each polymer. Alternatively, the polymers may be actually prepared, and actually measured values obtained by differential scanning calorimetry (DSC) or dynamic mechanical analysis (DMA) may be used.

The hydrophilic monofunctional radical-polymerizable compound (B) and the hydrophobic monofunctional radical-polymerizable compound (C) will be hereinafter referred to collectively as the monofunctional radical-polymerizable compounds (B+C). The content of the monofunctional radical-polymerizable compound (B+C) is preferably 30 parts by mass or more and 90 parts by mass or less and more preferably 50 parts by mass or more and 80 parts by mass or less with respect to 100 parts by mass of the radical-polymerizable compounds.

<Rubber Particles (D)>

Containing the rubber particles (D) in the curable resin composition can improve the impact resistance of its cured object.

The kind of the rubber particles is not particularly limited. Examples of preferred compositions forming the rubber particles include butadiene rubber, styrene-butadiene copolymer rubber, acrylonitrile-butadiene copolymer rubber, saturated rubbers obtained by hydrogenating or partially hydrogenating these diene rubbers, crosslinked butadiene rubber, isoprene rubber, chloroprene rubber, natural rubber, silicone rubber, ethylene-propylene-diene monomer ternary copolymer rubber, acrylic rubber, acrylic-silicone complex rubber, and the like. The rubber particles are preferably made of one of these compositions alone or a combination of two or more of the compositions. Among these, rubber particles made of one of butadiene rubber, crosslinked butadiene rubber, styrene-butadiene copolymer rubber, acrylic rubber, or silicone-acrylic complex rubber is particularly preferred from the viewpoint of improving the impact resistance and suppressing rise in the viscosity of the curable resin composition.

The glass transition temperature of the composition of the rubber particles is preferably 25° C. or less. The glass transition temperature is more preferably 20° C. or less. If the glass transition temperature is higher than 25° C., it tends to be difficult to achieve an impact resistance improving effect. The glass transition temperature of the composition of the rubber particles can be derived by differential scanning calorimetry (DSC) or dynamic mechanical analysis (DMA), for example.

The rubber particles are more preferably rubber particles each having a core-shell structure. Specifically, preferable are rubber particles which are the above-described rubber particles each serving as a core and further having a shell made of a polymer of a radical-polymerizable compound covering the exterior of the core. Using rubber particles having a core-shell structure can improve the dispersibility of the rubber particles in the resin composition containing the polyfunctional urethane (meth)acrylate (A), the hydrophilic monofunctional radical-polymerizable compound (B), and the hydrophobic monofunctional radical-polymerizable compound (C). As a result, a cured object in which the rubber particles are uniformly dispersed is obtained. In this way, the rubber particles function effectively inside the cured object and can therefore improve the impact resistance.

The polymer of the shell-forming radical-polymerizable compound is preferably in a form of being graft-polymerized to the surfaces of the cores via chemical bonding and covering the cores partially or entirely. Rubber particles each having a core-shell structure as a result of graft polymerization of a shell to a core can be formed by performing graft polymerization of a radical-polymerizable compound in the presence of core particles by a publicly known method. For example, the rubber particles can be produced by adding and polymerizing a radical-polymerizable compound being a shell forming component to latex particles dispersed in water, which can be prepared by emulsion polymerization, miniemulsion polymerization, suspension polymerization, seed polymerization, or the like.

Note that when the core surface does not have reactive sites such as ethylenically unsaturated groups to which a shell can be graft-polymerized or when the number of such sites is extremely small, an intermediate layer containing reactive sites may be provided on the surface of each particle, which serves as a core, and a shell may then be graft-polymerized. In sum, the forms of rubber particles having a core-shell structure also include the form in which a shell is provided on each core with an intermediate layer therebetween.

As the composition forming the core of each rubber particle having a core-shell structure, the above-mentioned compositions are usable. Among them, cores made of at least one of butadiene rubber, crosslinked butadiene rubber, styrene-butadiene copolymer rubber, acrylic rubber, or silicone-acrylic complex rubber are particularly preferred, since the softer the rubber particles are, the greater the improvement in impact resistance is expected.

As the shell-forming radical-polymerizable compound, a monofunctional radical-polymerizable compound having one radical-polymerizable functional group within a molecule is preferably usable. Rubber particles each having a shell containing a polymer of a monofunctional radical-polymerizable compound has good dispersibility when dispersed in a resin composition containing a radical-polymerizable compound.

The monofunctional radical-polymerizable compound to be used to form the shells can be selected as appropriate by taking into account the compatibility with the constituent composition of the cores and the dispersibility in the resin composition. For example, one of the materials exemplarily listed as the hydrophilic monofunctional radical-polymerizable compound (B) and the hydrophobic monofunctional radical-polymerizable compound (C) may be used, or two or more may be used in combination. It is preferred that the shells contain a polymer of a monofunctional radical-polymerizable compound having a (meth)acryloyl group since, in this way, the rubber particles are dispersed well in the curable resin composition and also rise in the viscosity of the curable resin composition can be suppressed. In particular, rubber particles each having a shell containing a polymer of a hydrophobic monofunctional radical-polymerizable compound having a (meth)acryloyl group are particularly preferred.

Also, a monofunctional radical-polymerizable compound and a polyfunctional radical-polymerizable compound may be used together as shell forming radical-polymerizable compounds. Forming the shells by using a polyfunctional radical-polymerizable compound lowers the viscosity of the curable resin composition and tends to make it easier to handle the curable resin composition. On the other hand, if the content of the polyfunctional radical-polymerizable compound is excessively high, it tends to be difficult to achieve an impact resistance improving effect by the addition of the rubber particles having a core-shell structure. For this reason, the polyfunctional radical-polymerizable compound to be used for the shell formation is preferably 0 part by mass or more and 40 parts by mass or less with respect to 100 parts by mass of the radical-polymerizable compounds to be used for the shell formation. Further, the content is more preferably 0 part by mass or more and 30 parts by mass or less and particularly preferably 0 part by mass or more and 25 parts by mass or less. The polyfunctional radical-polymerizable compound to be used for the shell formation can be selected as appropriate by taking into account the compatibility with the constituent composition of the cores and the dispersibility in the resin composition. One of the materials exemplarily listed as the polyfunctional urethane (meth)acrylate (A) and those to be exemplarily listed as the polyfunctional radical-polymerizable compound may be used, or two or more may be used in combination.

As for the mass ratio between the core and the shell of each rubber particle having a core-shell structure, the shell is preferably 1 part by mass or more and 200 parts by mass or less and more preferably 2 parts by mass or more and 180 parts by mass or less with respect to 100 parts by mass of the core. As long as the core-shell mass ratio is within the above range, the impact resistance can be effectively improved by containing rubber particles. If the shell is less than 1 part by mass, the dispersibility of the rubber particles in the curable resin composition is insufficient. Thus, it tends to be difficult to achieve an impact resistance improving effect. On the other hand, if the shell is more than 200 parts by mass, the dispersibility in the curable resin composition is good but each rubber particle is covered with a thick shell, so that the impact resistance improving effect by the rubber component is deteriorated. Accordingly, in order to achieve sufficient impact resistance, it is necessary to add a large amount of rubber particles, which increases the viscosity of the curable resin composition and tends to make it difficult to handle the curable resin composition.

The average particle size of the rubber particles is preferably 20 nm or more and 10 μm or less and more preferably 50 nm or more and 5 μm or less. If the average particle size is less than 20 nm, interaction between the rubber particles resulting from the rise in the viscosity in the curable resin composition and the increase in the specific surface area of the rubber particles due to adding them tends to cause a decrease in the heat resistance of a cured object and a decrease in the impact resistance thereof. On the other hand, if the average particle size is larger than 10 μm, it is difficult for the rubber particles (rubber component) to be dispersed in the curable resin composition, so that the impact resistance improving effect by the addition of the rubber particles tends to decrease.

The average particle size of the rubber particles in the present invention is the arithmetic (number) average particle size and can be measured using dynamic light scattering. For example, it can be measured using a particle size analyzer on the rubber particles dispersed in an appropriate organic solvent.

Also, the gel fraction of the rubber particles is preferably 5% or more. It is not preferred that the gel fraction be less than 5% since, in this way, the impact resistance and also the heat resistance tend to decrease. The gel fraction can be derived through the following procedure. Dry rubber particles $W1$ [g] are immersed in a sufficient amount of toluene and left at room temperature for seven days. Thereafter, the solid content is taken out by centrifugation or the like, followed by drying at 100° C. for two hours and measurement of the amount of the solid content obtained after the drying. Let the mass of the solid content obtained after the drying be $W2$ [g]. Then, the gel fraction can be derived by the following equation.

$$\text{Gel fraction (\%)}=W2/W1\times 100$$

The content of the rubber particles in the curable resin composition is 8 parts by mass or more and 50 parts by mass or less with respect to 100 parts by mass of a total of the radical-polymerizable compounds. The content is preferably 10 parts by mass or more and 40 parts by mass or less. If the content of the rubber particles is less than 8 parts by mass, it will be impossible to achieve an impact resistance improving effect by adding the rubber particles. On the other hand, if the content of the rubber particles is more than 50 parts by mass, the heat resistance of a cured object to be obtained will significantly decrease. In addition, the viscosity of the curable resin composition will significantly rise, thereby making it difficult to handle the curable resin composition.
(Radical Polymerization Initiator (E))

As a radical polymerization initiator (E), photoradical polymerization initiators and thermal radical polymerization initiators are usable.

The photoradical polymerization initiators are mainly classified into an intramolecular cleavage type and a hydrogen abstraction type. When the intramolecular cleavage-type photoradical polymerization initiator absorbs light of a particular wavelength, a bond at a particular site is cleaved, and a radical is generated at the cleaved site and serves as a polymerization initiator to initiate the polymerization of an ethylenically unsaturated compound containing a (meth) acryloyl group. On the other hand, the hydrogen abstraction type absorbs light of a particular wavelength to be brought into an excited state, and the resultant excited species causes a hydrogen abstraction reaction from a hydrogen donor present in the surroundings to generate a radical, which serves as a polymerization initiator to initiate the polymerization of a radical-polymerizable compound.

As the intramolecular cleavage-type photoradical polymerization initiator, there are known an alkylphenone-based photoradical polymerization initiator, an acylphosphine oxide-based photoradical polymerization initiator, and an oxime ester-based photoradical polymerization initiator. These are of a type that generates a radical species through the α-cleavage of a bond adjacent to a carbonyl group. The alkylphenone-based photoradical polymerization initiator includes a benzyl methyl ketal-based photoradical polymerization initiator, an α-hydroxyalkylphenone-based photoradical polymerization initiator, an aminoalkylphenone-based photoradical polymerization initiator, and the like. Specific examples of the compound include, but are not limited to: 2,2'-dimethoxy-1,2-diphenylethan-1-one (Irgacure (registered trademark) 651, manufactured by BASF) or the like as the benzyl methyl ketal-based photoradical polymerization initiator; 2-hydroxy-2-methyl-1-phenylpropan-1-one (Darocure 1173, manufactured by BASF), 1-hydroxycyclohexyl phenyl ketone (Irgacure 184, manufactured by BASF), 1-[4-(2-hydroxyethoxy)phenyl]-2-hydroxy-2-methyl-1-propan-1-one (Irgacure 2959, manufactured by BASF), 2-hydroxy-1-{4-[4-(2-hydroxy-2-methylpropionyl) benzyl]phenyl}-2-methylpropan-1-one (Irgacure 127, manufactured by BASF), or the like as the α-hydroxyalkylphenone-based photoradical polymerization initiator; 2-methyl-1-(4-methylthiophenyl)-2-morpholinopropan-1-one (Irgacure 907, manufactured by BASF), 2-benzylmethyl-2-dimethylamino-1-(4-morpholino phenyl)-1-butanone (Irgacure 369, manufactured by BASF), or the like as the aminoalkylphenone-based photoradical polymerization initiator; and the like. Examples of the acylphosphine oxide-based photoradical polymerization initiator include, but are not limited to, 2,4,6-trimethylbenzoyldiphenylphosphine oxide (Lucirin TPO, manufactured by BASF), bis(2,4,6-trimethylbenzoyl)-phenylphosphine oxide (Irgacure 819, manufactured by BASF), and the like. Examples of the oxime ester-based photoradical polymerization initiator include, but are not limited to, (2E)-2-(benzoyloxyimino)-1-[4-(phenylthio)phenyl]octan-1-one (Irgacure OXE-01, manufactured by BASF). Examples of product names are shown together in the parentheses.

The hydrogen abstraction-type radical polymerization initiator includes, but is not limited to: anthraquinone derivatives such as 2-ethyl-9,10-anthraquinone and 2-t-butyl-9,10-anthraquinone; and thioxanthone derivatives such as isopropylthioxanthone and 2,4-diethylthioxanthone. One of these photoradical polymerization initiators may be used alone, or two or more may be used in combination. In addition, the photoradical polymerization initiator may also be used in combination with the thermal radical polymerization initiator to be described later.

The amount of the photoradical polymerization initiator to be added is preferably 0.1 part by mass or more and 15 parts by mass or less with respect to 100 parts by mass of the radical-polymerizable compounds contained in the curable resin composition. The amount to be added is more preferably 0.1 part by mass or more and 10 parts by mass or less. If the amount of the photoradical polymerization initiator is small, the polymerization tends to be insufficient. If the polymerization initiator is added excessively, the molecular weight may fail to increase and the heat resistance or the impact resistance may therefore decrease. Here, the radical-polymerizable compounds are a combination of the polyfunctional urethane (meth)acrylate (A), the monofunctional radical-polymerizable compounds (B+C), and another polyfunctional radical-polymerizable compound(s).

Also, the thermal radical polymerization initiator is not particularly limited as long as it generates a radical by heating, and a conventionally known compound can be used. Preferred examples thereof may include an azo-based compound, a peroxide, a persulfuric acid salt, and the like. The azo-based compound includes 2,2'-azobisisobutyronitrile, 2,2'-azobis(methyl isobutyrate), 2,2'-azobis-2,4-dimethylvaleronitrile, 1,1'-azobis(1-acetoxy-1-phenylethane), and the like. The peroxide includes benzoyl peroxide, di-t-butylbenzoyl peroxide, t-butyl peroxypivalate, di(4-t-butylcyclohexyl)peroxydicarbonate, and the like. The persulfuric acid salt includes persulfuric acid salts such as ammonium persulfate, a sodium persulfate, and potassium persulfate.

The amount of the thermal radical polymerization initiator to be added is preferably 0.1 part by mass or more and 15 parts by mass or less and more preferably 0.1 part by mass or more and 10 parts by mass or less with respect to 100 parts by mass of the radical-polymerizable compounds contained in the curable resin composition. If the polymerization initiator is added excessively, the molecular weight may fail to increase and the heat resistance or the impact resistance may therefore decrease.

<Other Components (F)>

The curable resin composition may contain other components as long as the object and advantageous effects of the present invention are not impaired.

These other components include polyfunctional radical-polymerizable compounds other than the polyfunctional urethane (meth)acrylate (A) and additives.

First, a case of containing a polyfunctional radical-polymerizable compound other than the polyfunctional urethane (meth)acrylate (A) will be described.

In the case of containing a polyfunctional radical-polymerizable compound whose radical-polymerizable functional group equivalent is less than 300 g/eq, its content is preferably 20 parts by mass or less with respect to 100 parts by mass of a total of the radical-polymerizable compounds contained in the curable resin composition. The content is more preferably 18 parts by mass or less. Note that the radical-polymerizable functional group equivalent is a value indicating the molecular weight per radical-polymerizable functional group.

If the content of the polyfunctional radical-polymerizable compound whose radical-polymerizable functional group equivalent is less than 300 g/eq is more than 20 parts by mass, the crosslink density of a cured object tends to be high and at the same time the crosslink density tends to be not uniform. Consequently, there may be formed portions where stress is concentrated in response to application of stress from outside. This may lead to a failure to achieve the impact resistance improving effect expected be achieved by the addition of the rubber particles, and the Charpy impact strength may be as low as in conventional techniques.

In the case of containing a polyfunctional radical-polymerizable compound whose radical-polymerizable functional group equivalent is 300 g/eq or more, its content is preferably less than 50 parts by mass with respect to 100 parts by mass of a total of the radical-polymerizable compounds contained in the curable resin composition. If the content of the polyfunctional radical-polymerizable compound whose radical-polymerizable functional group equivalent is 300 g/eq or more is more than 50 parts by mass, the heat resistance decreases and the crosslink density of a cured object rises. Thus, it tends to be difficult to achieve the impact resistance improving effect expected to be achieved by the addition of the rubber particles.

The radical-polymerizable functional group in the polyfunctional radical-polymerizable compound other than the polyfunctional urethane (meth)acrylate (A) includes an ethylenically unsaturated group. The ethylenically unsaturated group includes the (meth)acryloyl group, vinyl group, and the like. Examples of the polyfunctional radical-polymerizable compound include a polyfunctional (meth)acrylate-based compound, vinyl ether group-containing (meth)acrylate-based compound, polyfunctional (meth)acryloyl group-containing isocyanurate-based compound, polyfunctional (meth)acrylamide-based compound, polyfunctional maleimide-based compound, polyfunctional vinyl ether-based compound, polyfunctional aromatic vinyl-based compound, and the like.

Examples of the polyfunctional (meth)acrylate-based compound may include ethylene glycol di(meth)acrylate, diethylene glycol di(meth)acrylate, triethylene glycol di(meth)acrylate, tetraethylene glycol di(meth)acrylate, nonaethylene glycol di(meth)acrylate, 1,3-butylene glycol di(meth)acrylate, 1,4-butanediol di(meth)acrylate, dimethyloltricyclodecane di(meth)acrylate, trimethylolpropane tri(meth)acrylate, neopentyl glycol di(meth)acrylate, 1,6-hexamethylene di(meth)acrylate, hydroxypivalic acid ester neopentyl glycol di(meth)acrylate, pentaerythritol tri(meth)acrylate, pentaerythritol tetra(meth)acrylate, ditrimethylolpropane tetraacrylate, dipentaerythritol tetra(meth)acrylate, dipentaerythritol penta(meth)acrylate, dipentaerythritol hexa(meth)acrylate, a di(meth)acrylate of an F-caprolactone adduct of neopentyl glycol hydroxypivalate (e.g., KAYARAD HX-220 and HX-620 manufactured by Nippon Kayaku Co., Ltd.), a di(meth)acrylate of an EO adduct of bisphenol A, a polyfunctional (meth)acrylate having a fluorine atom, a polyfunctional (meth)acrylate having a siloxane structure, polycarbonate diol di(meth)acrylate, polyester di(meth)acrylate, polyethylene glycol di(meth)acrylate, and the like.

Examples of the vinyl ether group-containing (meth)acrylate-based compound include 2-vinyloxyethyl (meth)acrylate, 4-vinyloxybutyl (meth)acrylate, 4-vinyloxycyclohexyl (meth)acrylate, 2-(vinyloxyethoxy)ethyl (meth)acrylate, 2-(vinyloxyethoxyethoxyethoxy)ethyl (meth)acrylate, and the like.

Examples of the polyfunctional (meth)acryloyl group-containing isocyanurate-based compound include tri(acryloyloxyethyl)isocyanurate, tri(methacryloyloxyethyl)isocyanurate, F-caprolactone-modified tris-(2-acryloxyethyl)isocyanurate, and the like.

The polyfunctional (meth)acrylamide-based compound includes N,N'-methylenebisacrylamide, N,N'-ethylenebisacrylamide, N,N'-(1,2-dihydroxyethylene)bisacrylamide, N,N'-methylenebismethacrylamide, N,N',N''-triacryloyldiethylenetriamine, and the like.

Examples of the polyfunctional maleimide-based compound include 4,4'-diphenylmethanebismaleimide, m-phenylenebismaleimide, bisphenol A diphenyl ether bismaleimide, 3,3'-dimethyl-5,5'-diethyl-4,4'-diphenylmethanebismaleimide, 4-methyl-1,3-phenylenebismaleimide, 1,6-bismaleimide-(2,2,4-trimethyl)hexane, and the like.

Examples of the polyfunctional vinyl ether-based compound include ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ether, bisphenol F alkylene oxide divinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, and the like.

Examples of the polyfunctional aromatic vinyl-based compound include divinylbenzene.

One of these polyfunctional radical-polymerizable compounds may be used alone, or two or more may be used in combination.

The additives include a physical property modifier for imparting a desired physical property to a cured object, photosensitizer, polymerization initiation aid, levelling agent, wettability improver, surfactant, plasticizer, UV absorber, silane coupling agent, inorganic filler, pigment, dye, antioxidant, flame retardant, thickener, defoamer, and the like.

The amount of the additives to be added is preferably 0.05 part by mass or more and 25 parts by mass or less with respect to 100 parts by mass of a total of the polyfunctional urethane (meth)acrylate (A), the monofunctional radical-polymerizable compounds (B+C), and the other polyfunctional radical-polymerizable compound(s). The amount to be added is more preferably 0.1 part by mass or more and 20 parts by mass or less. Within this range, desired physical properties can be imparted to a cured object to be obtained and the curable resin composition without decreasing the impact resistance of the cured object or raising its water absorption rate.

Examples of the physical property modifier for imparting a desired physical property to a cured object include: resins such as an epoxy resin, polyurethane, polychloroprene, polyester, polysiloxane, petroleum resin, xylene resin, ketone resin, and cellulose resin; engineering plastics such as polycarbonate, modified polyphenylene ether, polyamide, polyacetal, polyethylene terephthalate, polybutylene terephthalate, ultra-high molecular weight polyethylene, polyphenylsulfone, polysulfone, polyarylate, polyether imide, polyether ether ketone, polyphenylene sulfide, polyethersulfone, polyamide imide, liquid crystal polymer, polytetrafluoroethylene, polychlorotrifluoroethylene, and polyvinylidene fluoride; a fluorine-based oligomer, a silicone-based oligomer, and a polysulfide-based oligomer; soft metals such as gold, silver, and lead; layered crystal structure substances such as graphite, molybdenum disulfide, tungsten disulfide, boron nitride, graphite fluoride, calcium fluoride, barium fluoride, lithium fluoride, silicon nitride, molybdenum selenide; and the like.

Also, the photosensitizer includes a polymerization inhibitor such as phenothiazine or 2,6-di-t-butyl-4-methylphenol, benzoin compound, acetophenone compound, anthraquinone compound, thioxanthone compound, ketal compound, benzophenone compound, tertiary amine, xanthone compound, and the like.

<Curable Resin Composition>

As for the curable resin composition, appropriate amounts of the polyfunctional urethane (meth)acrylate (A), the monofunctional radical-polymerizable compounds (B+C), the rubber particles (D), the radical polymerization initiator (E), and, if necessary, another component(s) are introduced into an agitation container and agitated. The agitation temperature is normally 20° C. or more and 120° C. or less and preferably 40° C. or more and 100° C. or less. Then, a volatile solvent or the like is removed if necessary. As a result, the curable resin composition can be produced.

The curable resin composition according to the present invention is preferably usable as a shaping material to be used for a stereolithography method. That is, a shaped object of a desired shape can be produced by selectively irradiating the curable resin composition in the present embodiment with an active energy ray to supply energy necessary for curing. In the case of using the curable resin composition in the present embodiment as a shaping material for a stereolithography method, its viscosity at 25° C. is preferably 50 mPa s or more and 5,000 mPa s or less and more preferably 75 mPa s or more and 4,500 mPa s or less.

<Method of Producing Object>

A cured object (shaped object) obtainable by curing the curable resin composition according to the present invention can be fabricated using a publicly known stereolithography method and apparatus. Representative examples of a preferred stereolithography method include methods including a step of repeating curing the curable resin composition with a predetermined thickness based on slice data generated from three-dimensional shape data on a production target object (shaping model). There are mainly two types, free surface method and constrained surface method.

FIGURE illustrates an example of the configuration of a stereolithography apparatus 100 using the free surface method. The stereolithography apparatus 100 has a vessel 11 filled with a liquid photo-curable resin composition 10. Inside the vessel 11, a shaping stage 12 is provided such as to be vertically movable by a driving shaft 13. An optical energy ray 15 for curing the photo-curable resin composition 10 emitted from a light source 14 has its irradiation position changed by a galvanometer mirror 16 controlled by a controller 18 in accordance with slice data and is scanned over the surface of the liquid photo-curable resin composition 10. In FIGURE, the scanning rage is illustrated with the bold broken lines.

A thickness d of the photo-curable resin composition 10 to be cured by the optical energy ray 15 is a value determined based on settings at the time of generating the slice data and affects the accuracy of the shaped object to be obtained (the reproducibility of the three-dimensional shape data on the object to be shaped). The thickness d is achieved by the controller 18 controlling the amount of driving of the driving shaft 13.

First, the controller 18 controls the driving shaft 13 based on the settings to thereby supply the photo-curable resin composition onto the stage 12 to the thickness d. Based on the slice data, the liquid curable resin composition on the stage 12 is selectively irradiated with the optical energy ray such that a cured layer having a desired pattern will be obtained. As a result, the cured layer is formed. Thereafter, the stage 12 is moved in the direction of the outlined arrow to thereby supply the uncured curable resin composition onto the surface of the cured layer to the thickness d. Then, the optical energy ray 15 is applied based on the slice data, so that a cured object integrated with the previously formed cured layer is formed. By repeating this step of forming layers by curing, a target three-dimensionally shaped object can be obtained.

The three-dimensionally shaped object thus obtained is taken out of the vessel 11, and the unreacted curable resin composition remaining on its surface is removed. Then, cleaning is performed if necessary. An alcohol-based organic solvent as represented by an alcohol such as isopropyl alcohol or ethyl alcohol can be used as a cleaning agent. Besides the above, a ketone-based organic solvent as represented by acetone, ethyl acetate, or methyl ethyl ketone, or an aliphatic organic solvent as represented by any of terpenes may be used. Note that after the cleaning with the cleaning agent, post-curing may be performed by light irradiation or heat irradiation if necessary. The post-curing can cure the curable resin composition that may be left unreacted and remain on the surface and inside of the three-dimensionally shaped object, and hence can prevent the surface of the three-dimensionally shaped object from being sticky and also improve the initial strength of the three-dimensionally shaped object.

The optical energy ray to be used to produce the three-dimensionally shaped object may include an ultraviolet ray, electron beam, X ray, and radiation. Among these, an ultraviolet ray having a wavelength of 300 nm or more and 450 nm or less is preferably used from an economic viewpoint. As a light source for generating the ultraviolet ray, an ultraviolet laser (e.g., Ar laser or He—Cd laser), mercury lamp, xenon lamp, halogen lamp, fluorescent lamp, or the like can be used. Among those, the laser light source is preferably employed since it the light convergence property is good, the energy level can be increased to shorten the shaping time, and high shaping accuracy can be obtained.

In the formation of a cured layer of a predetermined shape pattern via irradiation of a surface made of the curable resin composition with an active energy ray, the resin can be cured in a dot-drawing mode or a line-drawing mode by using an optical energy ray converged into a dot shape or a line shape. Alternatively, the resin may be cured by irradiating it with an active energy ray in a planar shape through a planar drawing mask formed by arranging a plurality of micro-optical shutters, such as liquid crystal shutters or digital micro-mirror shutters.

Shaping by the constrained surface method is likewise preferred. A stereolithography apparatus using the constrained surface method has a configuration in which the stage 12 of the stereolithography apparatus 100 in FIGURE is provided such as to pull a shaped object upward above the liquid surface, and a light irradiation unit is provided under the vessel 11. A representative example of shaping by the constrained surface method is as follows. First, the support surface of a support stage provided such as to be capable of being raised and lowered and the bottom surface of a vessel storing the curable resin composition are placed with a predetermined distance therebetween, and the curable resin composition is supplied between the support surface of the support stage and the bottom surface of the vessel. Thereafter, from the bottom surface side of the vessel storing the curable resin composition, a laser light source or a project selectively irradiates the curable resin composition between the support surface of the stage and the bottom surface of the vessel with light according to slice data. By the light irradiation, the curable resin composition between the support surface of the stage and the bottom surface of the vessel is cured, so that a solid cured resin layer is formed. Then, the support stage is raised to thereby pull the cured resin layer off the bottom surface of the vessel.

Thereafter, the height of the support stage is adjusted such as to leave the predetermined distance between the cured layer formed on the support stage and the bottom surface of the vessel. Then, light is selectively applied similarly to the previous step. As a result, between the cured resin layer and the bottom surface of the vessel, a new cured resin layer is formed which is integrated with the previously formed cured resin layer. Then, this step is repeated a predetermined number of times with the light irradiation pattern changed or not changed. As a result, a three-dimensionally shaped object being a plurality of cured resin layers laminated together is shaped.

EXAMPLES

Hereinafter, the present embodiment will be described in detail based on Examples. However, the present embodiment is not limited to these Examples.

<Materials Used>

Materials used in Examples and Comparative Examples are listed below.

<Polyfunctional Urethane (Meth)acrylate (A)>
- A-1: Difunctional urethane acrylate; "KAYARAD UX-6101" (manufactured by Nippon Kayaku Co., Ltd., weight-average molecular weight (actually measured value): $6.7 \times 10^3$)
- A-2: Difunctional urethane acrylate; "KAYARAD UX-8101" (manufactured by Nippon Kayaku Co., Ltd., weight-average molecular weight (actually measured value): $3.3 \times 10^3$)
- A-3: Difunctional urethane acrylate; "CN9001NS" (manufactured by Arkema, weight average molecular weight (actually measured value): $5.4 \times 10^3$)

[Hydrophilic Monofunctional Radical-Polymerizable Compound (B)]
- B-1: acryloylmorpholine; "ACMO" (manufactured by KJ Chemicals Corporation)
- B-2: N,N-diethylacrylamide; "DEAA" (manufactured by KJ Chemicals Corporation)
- B-3: N-vinylcaprolactam
- B-4: 2-hydroxyethyl methacrylate
- B-5: Diacetone acrylamide; "DAAM" (manufactured by KJ Chemicals Corporation)

[Hydrophobic Monofunctional Radical-Polymerizable Compound (C)]
- C-1: Isobornyl acrylate
- C-2: N-phenylmaleimide; "imilex-P" (manufactured by Nippon Shokubai Co., Ltd.)
- C-3: N-cyclohexylmaleimide; "imilex-C" (manufactured by Nippon Shokubai Co., Ltd.)

[Rubber Particles (D)]

Acetone dispersions of rubber particles D-1 and D-2 were manufacture by the methods described below.

<Production of Acetone Dispersion of Rubber Particles D-1>

A 1 L glass container was loaded with 185 parts by mass of a polybutadiene latex (Nipol LX111A2: manufactured by Zeon Corporation) (corresponding to 100 parts by mass of polybutadiene rubber particles) and 315 parts by mass of deionized water, followed by agitation at 60° C. with nitrogen substitution. Further, 0.005 part by mass of disodium ethylenediaminetetraacetate (EDTA), 0.001 part by mass of ferrous sulfate heptahydrate, and 0.2 part by mass of sodium formaldehyde sulfoxylate were added. Thereafter, a mixture of 35 parts by mass of shell-forming radical-polymerizable compounds (17.5 parts by mass of methyl methacrylate (MMA) and 17.5 parts by mass of isobornyl methacrylate (IBMA)) and 0.1 part by mass of cumene hydroperoxide was continuously added over two hours. Consequently, the radical-polymerizable compounds were graft-polymerized onto the surfaces of the polybutadiene rubber particles. After adding the shell-forming materials, the mixture was further agitated for two hours to complete the reaction. As a result, an aqueous dispersion of core-shell type rubber particles D-1 each having polybutadiene rubber as a core and a copolymer of MMA and IBMA as a shell was obtained.

The aqueous dispersion of the core-shell type rubber particles obtained through the above procedure was introduced into 450 parts by mass of acetone, and they were uniformly mixed. A centrifuge was used to perform substitution with acetone, so that an acetone dispersion of the core-shell type rubber particles D-1 was obtained. The average particle size of the core-shell type rubber particles D-1 measured using dynamic light scattering was 0.25 m.

<Production of Acetone Dispersion of Rubber Particles D-2>

20 parts by mass of the rubber particles D-2 (KaneAce M-511 (manufactured by Kaneka Corporation)) and 80 parts by mass of acetone were mixed, and the rubber particles D-2 were dispersed using an ultrasonic homogenizer until becoming primary particles. As a result, an acetone dispersion of the core-shell type rubber particles D-2 was obtained. The average particle size of the core-shell type rubber particles D-2 measured using dynamic light scattering was 0.23 m.

[Radical Polymerization Initiator (E)]

E-1: Photoradical generator; "Irgacure 819" (manufactured by BASF)

[Another Component (Polyfunctional Radical-Polymerizable Compound) (F)]

F-1: Polycarbonate diol diacrylate "UM-90 (1/3) DM" (molecular weight: approximately 900, radical-polymerizable functional group equivalent: approximately 450 g/eq, manufactured by Ube Industries, Ltd.)

F-2: Ethoxylated isocyanurate triacrylate; "A-9300" (molecular weight: 423, radical-polymerizable functional group equivalent: 141 g/eq, manufactured by Shin-Nakamura Chemical Co., Ltd.)

<Production of Curable Resin Compositions>

Materials were blended at the blending ratios shown in Table 1 and uniformly mixed. The acetone dispersion of the rubber particles D-1 or D-2 was mixed into each mixture, and the acetone, which was a volatile component, was removed. As a result, curable resin compositions according to Examples 1 to 13 and Comparative Examples 1 to 6 were obtained.

<Preparation of Test Pieces>

Cured objects were prepared from the prepared curable resin compositions by the following method. First, a mold having a length of 80 mm, a width of 10 mm, and a thickness of 4 mm was sandwiched between two sheets of quartz glass, and the curable resin composition was poured thereinto. The poured curable resin composition was irradiated with 5 mW/cm$^2$ of an ultraviolet ray from both surfaces of the mold alternately two times for 180 seconds each, with an ultraviolet irradiator (manufactured by HOYA CANDEO OPTRONICS CORPORATION, product name: "LIGHT SOURCE EXECURE 3000"). The obtained cured product was put in a heating oven and subjected to heat treatment at 70° C. for two hours. As a result, a test piece having a length of 80 mm, a width of 10 mm, and a thickness of 4 mm was obtained.

<Evaluation>

[Weight Average Molecular Weight]

Two Shodex GPC LF-804 columns (manufactured by Showa Denko K.K., exclusion limit molecular weight: 2×10$^6$, separation range: 300 to 2×10$^6$) were arranged in series in a gel permeation chromatography (GPC) apparatus (manufactured by Tosoh Corporation, HLC-8220GPC), and the weight average molecular weight was measured with a differential refractive index (RI) detector at 40° C. with THF used as a developing solvent. The obtained weight average molecular weight is a value in terms of standard polystyrene.

[Average Particle Size of Rubber Particles]

With use of a particle size analyzer (manufactured by Malvern, Zetasizer Nano ZS), approximately 1 ml of a dilute acetone dispersion of the rubber particles (D-1) was placed in a glass cell, and the arithmetic (number) average particle size was measured at 25° C.

[Glass Transition Temperature (Tg) of Polymers of Monofunctional Radical-Polymerizable Compounds]

As for Tg of the polymer of each monofunctional radical-polymerizable compound, Tg of polymers of commonly known monofunctional radical-polymerizable compounds was calculated using the Fox equation mentioned earlier, and Tg of the others was measured with a rheometer (Physica MCR 302, manufactured by Anton Paar GmbH). In Table 1, each case where Tg of the polymer of the monofunctional radical-polymerizable compound was 85° C. or more is indicated as "G(ood)" while the case where Tg was less than 85° C. is indicated as "B(ad)".

[Viscosity of Curable Resin Compositions]

The viscosity of each curable resin composition was measured by a rotational rheometer method. Specifically, the viscosity was measured as follows by using a rheometer (Physica MCR 302, manufactured by Anton Paar GmbH).

Approximately 0.5 mL of the sample was loaded into the rheometer with a corn plate type measurement jig (CP25-2, manufactured by Anton Paar GmbH; 25-mm diameter, 2°) attached thereto, and adjusted to 25° C. Under a condition of a constant sheer rate of 50 s-1, measurement was made at data intervals of 6 seconds, and the value at 120 seconds was determined as the viscosity. The viscosity was evaluated according to the criteria below.

A (Very Good): The viscosity is less than 2.0 Pa s.
B (Good): The viscosity is 2.0 Pa s or more and less than 5.0 Pa s.
C (Bad): The viscosity is 5.0 Pa s or more.

[Deflection Temperature Under Load]

In conformity with JIS K 7191-2, the temperature of each test piece was raised by 2° C. per minute from room temperature with a deflection-temperature-under-load tester (manufactured by Toyo Seiki Seisaku-sho, Ltd., product name: "No. 533 HDT TESTER 3M-2") under a bending stress of 1.80 mPa. The temperature at which the amount of deflection of the test piece reached 0.34 mm was employed as the deflection temperature under load and used as an indicator of the heat resistance. The obtained results are shown in Table 1. The heat resistance was evaluated according to the criteria below.

A (Very Good): The deflection temperature under load is 80° C. or more.
B (Good): The deflection temperature under load is 60° C. or more and less than 80° C.
C (Bad): The deflection temperature under load is less than 60° C.

[Charpy Impact Strength]

In conformity with JIS K 7111, a 45° cutout (notch) having a depth of 2 mm was formed at the center of each test piece with a cutout-forming machine (manufactured by Toyo Seiki Seisaku-sho, Ltd., product name: "NOTCHING TOOL A-4"). The test piece was fractured from its surface opposite to the cutout with an energy of 2 J by using an impact tester (manufactured by Toyo Seiki Seisaku-sho, Ltd., product name: "IMPACT TESTER IT"). The energy required for the fracture was calculated from the angle to which a hammer raised to 150° swung up after the fracture of the test piece, and was employed as the Charpy impact strength and used as an indicator of the impact resistance. The obtained results are shown in Table 1. The impact resistance was evaluated according to the criteria below.

A (Very Good): The Charpy impact strength is 12 kJ/m$^2$ or more.
B (Good): The Charpy impact strength is 8 kJ/m$^2$ or more and less than 12 kJ/m$^2$.
C (Bad): The Charpy impact strength is less than 8 kJ/m$^2$.

[Water Absorption Rate]

For each test piece, a value obtained by weighing the test piece after drying it at 50° C. for 24 hours was defined as M1 (g), and a value obtained by weighing the test piece after immersing it in 300 ml or more of water, leaving it for 24 hours at room temperature, and wiping the water on the surface was defined as M2 (g). These values were plugged into the equation below to calculate the water absorption rate.

Water absorption rate [%]=$(M2-M1)/M1\times 100$

The water absorption rate was evaluated according to the criteria below.

A (Very Good): The water absorption rate is less than 2.0%.
B (Good): The water absorption rate is 2.0% or more and less than 10%.
C (Good): The water absorption rate is 10% or more.

resin composition containing no hydrophobic monofunctional radical-polymerizable compound (C), the water absorption rate was high to such an extent that practical issues would occur. As for the curable resin composition according to Comparative Example 2, which contained 60 parts by mass of a hydrophobic monofunctional radical-polymerizable compound (C-1) having an alicyclic hydrocarbon group with respect to 100 parts by mass of a total of radical-polymerizable compounds in the curable resin composition, the viscosity was extremely high to such an extent that it was difficult to perform shaping using a stereolithography method. As for the cured object according to Comparative Example 3 obtained from a curable resin composition in which the content of the rubber particles (D) was as small as 5 parts by mass, the improvement in impact resistance was not sufficient. Moreover, as for the cured object according to Comparative Example 4 obtained from

TABLE 1

| | | Example | | | | | | | | | | | | | Comparative Example | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 1 | 2 | 3 | 4 |
| A: Polyfunctional urethane (meth)acrylate (parts by mass) | A-1 | 30 | 30 | 35 | 30 | 40 | 35 | 25 | 30 | 30 | 30 | 30 | 30 | | 30 | 30 | 30 | 30 |
| | A-2 | | | | | | | | 10 | | | | | | | | | |
| | A-3 | | | | | | | | | | | | | 30 | | | | |
| B: Hydrophilic monofunctional radical-polymerizable compound (parts by mass) | B-1 | 40 | 40 | 45 | 30 | 40 | 35 | 30 | 30 | 40 | | | | | 70 | 10 | 40 | |
| | B-2 | | | | 10 | | | | | | | | | | | | | |
| | B-3 | | | | | | | | | | 40 | 40 | 40 | 40 | | | | |
| | B-4 | | | | | | | | | | | | | | | | | 30 |
| | B-5 | | | | | | | | | | | | 15 | 15 | | | | |
| C: Hydrophobic monofunctional radical-polymerizable compound (parts by mass) | C-1 | 20 | 10 | 20 | 10 | | | | 20 | 20 | 30 | 20 | 10 | 10 | | 60 | 20 | 40 |
| | C-2 | 10 | 20 | | 20 | 20 | 15 | 15 | 10 | 10 | | | | | | | 10 | |
| | C-3 | | | | | | 15 | 10 | | | | | | | | | | |
| Polyfunctional radical-polymerizable compound (parts by mass) | F-1 | | | | | | | 20 | | | | | | | | | | |
| | F-2 | | | | | | | | | | | 10 | 5 | 5 | | | | |
| D: Rubber particles (parts by mass) | D-1 | 18 | 18 | 18 | 18 | 25 | 25 | 18 | 18 | 11 | 18 | 18 | | | 25 | 18 | 5 | 18 |
| | D-2 | | | | | | | | | | | | | | | | | |
| E: Radical polymerization initiator (parts by mass) | E-1 | 1 | 1 | 1 | 1 | 1 | 1 | 1 | 1 | 1 | 1 | 1 | 1 | 1 | 1 | 1 | 1 | 1 |
| Evaluation on Tg of polymer of component B and component C | | G | G | G | G | G | G | G | G | G | G | G | G | G | G | G | G | B |
| Composition Viscosity (Pa·s) | | 2.1 | 2.0 | 2.3 | 1.9 | 2.7 | 2.1 | 2.3 | 2.7 | 1.4 | 1.0 | 0.7 | 1.7 | 2.4 | 1.5 | 9.6 | 1.0 | 1.0 |
| | | B | B | B | A | B | B | B | B | A | A | A | A | B | A | C | A | A |
| Deflection temperature under load (° C.) | | 72 | 89 | 81 | 72 | 79 | 71 | 63 | 67 | 73 | 65 | 75 | 66 | 65 | 78 | 61 | 75 | 40 |
| | | B | A | A | B | A | B | B | B | B | B | B | B | B | B | B | B | C |
| Charpy impact strength (kJ/m²) | | 11.3 | 10.9 | 11.2 | 9.8 | 13.0 | 11.6 | 12.0 | 11.6 | 8.2 | 11.7 | 8.6 | 9.8 | 9.1 | 14.1 | 12.5 | 5.2 | 17.6 |
| | | B | B | B | B | A | B | A | B | B | B | B | B | B | A | A | C | A |
| Water absorption Rate (%) | | 1.1 | 1.2 | 2.2 | 1.0 | 1.6 | 1.0 | 0.7 | 0.9 | 1.2 | 0.7 | 0.9 | 2.1 | 1.6 | 36.0 | 0.4 | 1.3 | 0.9 |
| | | A | A | B | A | A | A | A | A | A | A | A | B | A | C | A | A | A |

In Table 1, a blank means that the corresponding material is not contained in the composition.

As shown in Table 1, each of the curable resin compositions prepared in Examples 1 to 13 had viscosity in a preferred range as a shaping material to be used for a stereolithography method. Also, each obtained cured object had good impact resistance and heat resistance and also had a low water absorption rate and therefore good water resistance.

On the other hand, as for the cured object according to Comparative Example 1, which was obtained from a curable a curable resin composition in which the glass transition temperature of the polymer of its monofunctional radical-polymerizable compounds was as low as less than 85° C., the heat resistance was not sufficient. Furthermore, as for the cured object according to Comparative Example 5 obtained from a curable resin composition in which the content of its polyfunctional radical-polymerizable compound having a radical-polymerizable functional group equivalent of less than 300 g/eq was as large as 25 parts by mass, the improvement in impact resistance was not sufficient. Similarly, as for the cured object according to Comparative Example 6 obtained from a curable resin composition in which the content of its polyfunctional radical-polymerizable compound having a radical-polymerizable functional group equivalent of 300 g/eq or more was as large as 50 parts by mass, the heat resistance was not sufficient.

From the above results and according to the present invention, it was confirmed that curing a curable resin composition with viscosity suitable for a stereolithography method could provide a cured object having good impact resistance, a low water absorption rate, and heat resistance.

According to the present disclosure, it is possible to provide a curable resin composition with which a cured object with low water absorbency and good impact resistance and heat resistance can be formed and which is preferable for three-dimensional shaping.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A curable resin composition comprising:
   a polyfunctional urethane (meth)acrylate (A) having a weight average molecular weight of 1000 to 60000;
   a hydrophilic monofunctional radical-polymerizable compound (B);
   a hydrophobic monofunctional radical-polymerizable compound (C);
   rubber particles (D); and
   a radical polymerization initiator (E), and
   wherein the hydrophilic monofunctional radical-polymerizable compound (B) includes a hydrophilic monofunctional acrylamide-based compound or a hydrophilic monofunctional radical-polymerizable compound having an N-vinyl group.

2. The curable resin composition according to claim 1, wherein a content of the rubber particles (D) is 8 parts by mass to 50 parts by mass with respect to 100 parts by mass of radical-polymerizable compounds.

3. The curable resin composition according to claim 1, wherein a content of the rubber particles (D) is 10 parts by mass to 40 parts by mass with respect to 100 parts by mass of radical-polymerizable compounds.

4. The curable resin composition according to claim 1, wherein a content of the hydrophilic monofunctional radical-polymerizable compound (B) is 65 parts by mass or less with respect to 100 parts by mass of a total of radical-polymerizable compounds including the hydrophilic monofunctional radical-polymerizable compound (B).

5. The curable resin composition according to claim 1, wherein a content of a hydrophilic monofunctional radical-polymerizable compound (b-1) that has a water solubility of 20 [g/100 g] or more in the hydrophilic monofunctional radical-polymerizable compound (B) is 55 parts by mass or less with respect to 100 parts by mass of a total of radical-polymerizable compounds including the hydrophilic monofunctional radical-polymerizable compound (b-1).

6. The curable resin composition according to claim 1, wherein the hydrophilic monofunctional radical-polymerizable compound having the N-vinyl group is selected from the group consisting of N-vinylpyrrolidone, N-vinylcaprolactam, and N-vinylacetamide.

7. The curable resin composition according to claim 1, wherein, a content of a hydrophobic monofunctional radical-polymerizable compound (c-1) having an alicyclic hydrocarbon group in the hydrophobic monofunctional radical-polymerizable compound (C) is less than 60 parts by mass with respect to 100 parts by mass of a total of radical-polymerizable compounds in the curable resin composition.

8. The curable resin composition according to claim 1, wherein a content of a polyfunctional radical-polymerizable compound having a radical-polymerizable functional group equivalent of less than 300 g/eq is 20 parts by mass or less with respect to 100 parts by mass of a total of radical-polymerizable compounds in the curable resin composition.

9. The curable resin composition according to claim 1, wherein a glass transition temperature of a copolymer of the hydrophilic monofunctional radical-polymerizable compound (B) and the hydrophobic monofunctional radical-polymerizable compound (C) is 85° C. or more.

10. A cured object of the curable resin composition comprising:
    a polyfunctional urethane (meth)acrylate (A) having a weight average molecular weight of 1000 to 60000;
    a hydrophilic monofunctional radical-polymerizable compound (B);
    a hydrophobic monofunctional radical-polymerizable compound (C);
    rubber particles (D); and
    a radical polymerization initiator (E), and
    wherein the hydrophilic monofunctional radical-polymerizable compound (B) includes a hydrophilic monofunctional acrylamide-based compound or a hydrophilic monofunctional radical-polymerizable compound having an N-vinyl group.

11. The curable resin composition according to claim 1, wherein a content of the hydrophilic monofunctional radical-polymerizable compound (B) is equal to or greater than a content of the hydrophobic monofunctional radical-polymerizable compound (C).

12. The curable resin composition according to claim 2, wherein a content of the hydrophilic monofunctional radical-polymerizable compound (B) is equal to or greater than a content of the hydrophobic monofunctional radical-polymerizable compound (C).

13. The curable resin composition according to claim 1, wherein the hydrophilic monofunctional radical-polymerizable compound is selected from the group consisting of N-vinylpyrrolidone, N-vinylcaprolactam, and N-vinylacetamide.

14. The cured object according to claim 10, wherein a content of the rubber particles (D) is 8 parts by mass to 50 parts by mass with respect to 100 parts by mass of radical-polymerizable compounds.

15. The cured object according to claim 10, wherein the hydrophilic monofunctional radical-polymerizable compound having the N-vinyl group is selected from the group consisting of N-vinylpyrrolidone, N-vinylcaprolactam, and N-vinylacetamide.

16. The cured object according to claim 10, wherein a content of the hydrophilic monofunctional radical-polymerizable compound (B) is equal to or greater than a content of the hydrophobic monofunctional radical-polymerizable compound (C).

17. The cured object according to claim 10, wherein a deflection temperature under load of the cured product is 60° C. or more.

18. The cured object according to claim 10, wherein the hydrophilic monofunctional radical-polymerizable compound is selected from the group consisting of N-vinylpyrrolidone, N-vinylcaprolactam and N-vinylacetamide.

19. The cured object according to claim 14, wherein a content of the hydrophilic monofunctional radical-polymerizable compound (B) is equal to or greater than a content of the hydrophobic monofunctional radical-polymerizable compound (C).

* * * * *